(No Model.)
J. F. CARPENTER.
Automatic Brake for Railway Trains.
No. 242,812. Patented June 14, 1881.
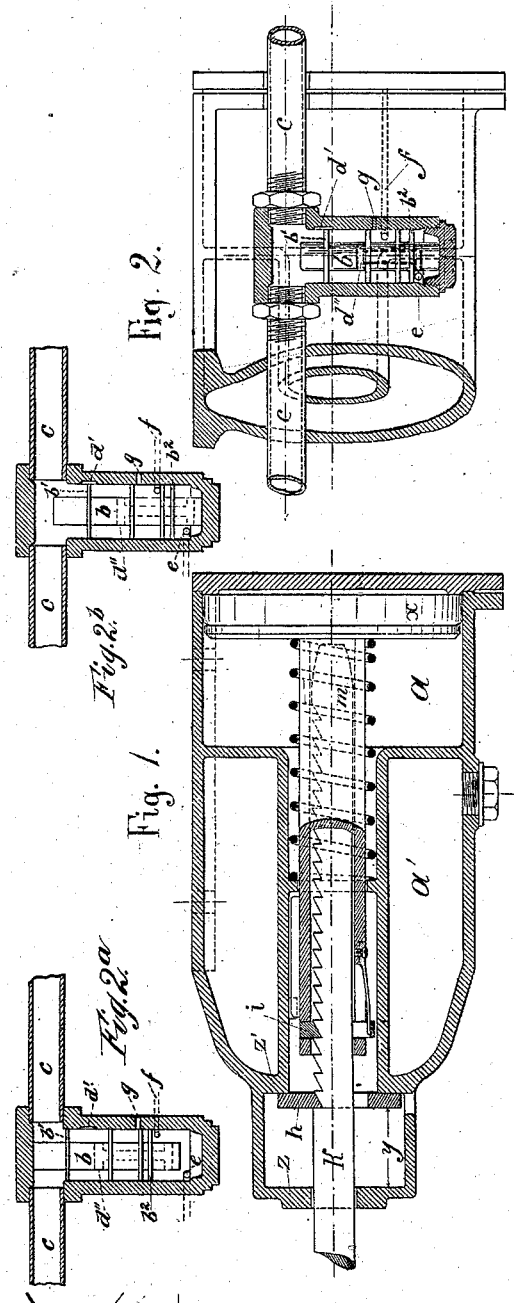
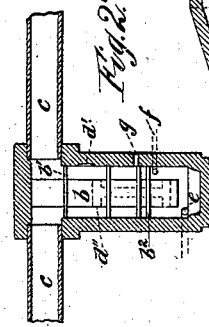
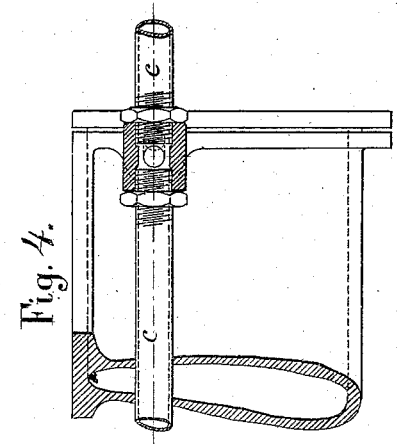
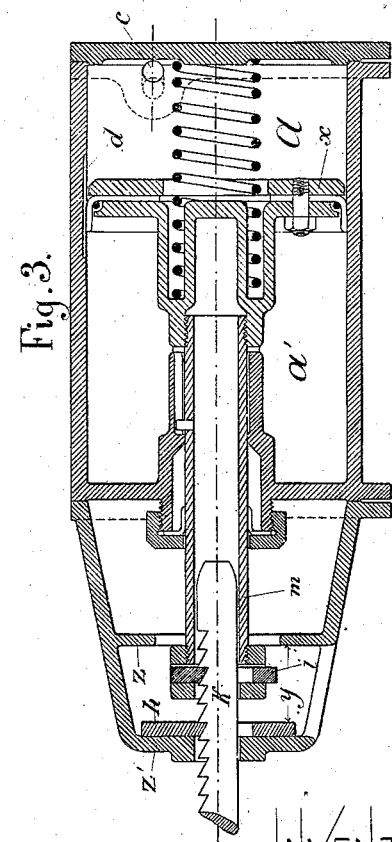
WITNESSES
Charles C. Stetson
Charles R. Searle
INVENTOR
Jesse F. Carpenter
by his attorney
J. C. Stetson

UNITED STATES PATENT OFFICE.

JESSE F. CARPENTER, OF BERLIN, PRUSSIA, GERMANY.

AUTOMATIC BRAKE FOR RAILWAY-TRAINS.

SPECIFICATION forming part of Letters Patent No. 242,812, dated June 14, 1881.

Application filed November 17, 1880. (No model.) Patented in Germany March 24, 1880, in Belgium July 23, 1880, and in France July 26, 1880.

*To all whom it may concern:*

Be it known that I, JESSE FAIRFIELD CARPENTER, a native-born citizen of the United States of America, but at present resident in the city of Berlin, Kingdom of Prussia, German Empire, have invented new and useful Improvements in Continuous Automatic Brakes for Railway-Trains, (for which Friedrich Carl Glaser has obtained patents in Belgium, No. 52,096, bearing date July 23, 1880, in France, No. 137,946, bearing date July 26, 1880, and in Germany, No. 11,095, bearing date March 24, 1880,) of which the following is a specification.

I have succeeded in providing a reservoir of compressed air in each brake mechanism so near to the cylinder in which it is allowed to act on the piston that no ordinary accident can prevent its being available, and in combining therewith a self-adjusting brake mechanism to allow for maladjustment or wear of the parts, and provisions for supplying the compressed air and controlling its action by a single pipe, with an automatic valve for applying and releasing the brake sufficiently sensitive for practical purposes, but of such stability as to prevent the application of the brake by small leaks, jolting of the train, and the like causes, and so as to apply the brakes instantly and forcibly by the act of the engineer or on the separation or derailment of a train. By reason of my automatic brake-regulator the brake-blocks do not require regulation at all by hand, the wear of the blocks and of the tires being taken up by the mechanism itself automatically, and the main piston of the air-brake maintaining its normal stroke until the blocks are worn out. It renders it needless to provide in the cylinder spare room or clearance, which requires to be filled and emptied uselessly in every application of the brake.

The accompanying drawings form a part of this specification, and represent what I consider the best means of carrying out the invention.

Figure 1 is a longitudinal section through a cylinder with the automatic adjustment. Fig. 2 is a section, showing the automatic valve and an elevation of a portion of the cylinder seen beyond. Figs. $2^a$ and $2^b$ are sections, showing the valve distinct from the other parts. Fig. $2^a$ shows it elevated to apply the brake. Fig. $2^b$ shows it depressed again, as in Fig. 2. The remaining figures show a modification. Fig. 3 is a section corresponding to Fig. 1 in the plane of the axis of the cylinder, and Fig. 4 is a section in the plane of the main pipe which connects it with the air-compressor and controlling-cock, supposed to be on the locomotive. (Not represented.)

Similar letters of reference indicate corresponding parts in all the figures.

Referring to Figs. 1, 2, $2^a$, and $2^b$, compressed air or other fluid from the main pipe $c$, driven by any efficient forcing means, (not represented,) enters the valve-chamber above the compound valve $b$ $b'$ $b^2$. It moves downward past the first or upper ring, $b'$, which fits pistonwise, except that there is a contracted groove, $d'$, of limited width and depth and of little length, through which the air can move. A hole, $d^2$, in the spindle or body $b$ forms a free passage for the air to communicate with its full pressure below the bottom ring, $b^2$, whence it flows easily through the hole $e$ to the chamber $a'$ and fills it.

To apply the brakes the pressure in the train-pipe $c$ must be suddenly reduced, which can be effected by the engineer opening a cock properly arranged on the connections near the locomotive. When the pressure in the pipe $c$ and above the valve $b$ $b'$ $b^2$ has become sufficiently reduced, which may be effected instantly by the sudden escape of air, the valve is raised by the pressure of the air beneath it, which cannot exhaust with any great rapidity through the groove $d'$. The rising of $b$ carries $b'$ beyond the groove $d'$, preventing any further leakage, and lifts $b^2$ above the hole $f$, so connecting the chamber $a'$ to the cylinder $a$ behind the piston $x$. The compressed air accumulated in $a'$ now flows freely therefrom and the main piston $x$ is pushed outward by the air in the chamber $a$ and applies the brakes in the usual way.

To release or take off the brake the pressure in the train-pipe is restored and forces $b$ down, when the position of $b$ is such that the hole $f$ is between the same rings as the hole $g$—i. e., position shown in Figs. 2 and $2^b$. Therefore the compressed air escapes to the atmosphere from behind the piston $x$ and the brake is released. The compound valve $b$ is capable also of applying the brake with varying degrees of force, for if a small reduction—say ten pounds only—be made in the pressure in the train-pipe $c\ c$, the valve, after rising and letting a sufficient amount of air pass from the chamber $a'$ to the cylinder $a$ to reduce the pressure in it by expansion to a slightly lower point than it is in the train-pipe, will begin to move down, cutting off further connection between the two chambers $a$ and $a'$ and opening the groove $d'$, which will restore and maintain the condition of equilibrium between the two sides of the valve, so the valve stops and is retained in position by its friction with the case. In the meantime the hole $f$ will have been open into the space between the bottom two pistons only, and consequently the air will not be able to escape and the brake will be held on. A further reduction of pressure in the train-pipe would cause an increased flow of compressed air or fluid behind the piston $x$, putting the brake still harder on, while an increase of pressure in the main pipe $c\,c$ would release the brake by forcing the valve down to its original position, as shown in Fig. 2. Besides its extreme simplicity, this valve, by resting on the bottom of the chamber, has the great advantage of stability and freedom from disturbance by slight leaks or other causes to which valves are liable that work in a contrary direction, and have therefore to be held up or balanced by the air itself while the brake is out of action.

The automatic brake-block regulator is formed by the usual push-rod, $k$, entering the piston-rod $m$, which is of tubular form, as shown in Fig. 1. The push-rod $k$ has a series of notches, in which rest the regulating-plates $h$ and $i$. The distance $y$ is the normal stroke of the piston $x$ in applying the brake. When, however, through wear of the blocks or tires, the push-rod $k$ travels farther out, the plate $h$ is stopped by the end $z$ of the cylinder, and, rising over one of the inclines or teeth, falls into the next notch. On the return of the piston the plate $h$ is again stopped, as seen in Fig. 1, and the push-rod is thus held one notch farther out; but the piston $x$, acted upon by the usual spiral spring, returns fully to the end of the cylinder, and draws, therefore, the plate $i$ over a tooth also. Thus the push-rod $k$ is one notch farther out of the piston-rod $m$, and the blocks are set up a corresponding distance nearer the wheels. This outward movement of the push-rod is continued as required until the blocks are wholly worn out. On new blocks being put in the push-rod is turned half round, bringing the regulating-plates out of action, and is then shoved back home and again turned to its original position, and all is again in order.

This apparatus can be made with the push-rod hollow and the piston-rod solid, or as shown in Fig. 3, where the push-rod is converted into a pull-rod; or the regulating-plates could be attached to any other part of the brake-rigging and produce the same result.

It will be seen that the heavy strains of the brake are brought directly upon the push-rod itself. The plates $h$ and $i$ cannot turn round or get out of the notches themselves on account of their oblong shape. This mode of regulation enables me to dispense with the excessive length of cylinder, usually three or four times the proper stroke of the piston, which is necessary to allow for the wearing of the blocks where there is no such automatic regulator. This extra space to be filled behind the piston causes great waste of air and slowness of action, and in addition renders it possible that the brake on any particular vehicle may not act at all in consequence of its piston coming into contact with the cylinder end. My regulator conduces, therefore, greatly to safety and to economy in the use of continuous brakes, saves air, and enables me to reduce the size of the apparatus more than one-half.

Fig. 3 shows this regulator in combination with a simpler form of automatic brake having no valves at all. Air, entering the back part of the cylinder at $c$, (through the main pipe $c\ c$, Fig. 4,) charges the chamber $a$, Fig. 3, and forcing the piston $x$ back a certain distance, then by groove or channel $d$ passes said piston $x$ and charges the chamber $a'$ on the other side of the piston. If, now, the pressure in the train-pipe be suddenly reduced, the chamber $a$ will be emptied, and the compressed air on the other side of the piston (not being able to escape so rapidly through the small groove $d$) will force the piston forward, shutting off communication by the groove, and, proceeding farther, will apply the brake. Thus in a simple cylinder the piston not only acts as a division or diaphragm forming two chambers, but also acts as the valve or cut-off. It will be seen that this system is much assisted by the automatic regulator, which reduces the amount of air to be exhausted to very much less—say one-third or one-fourth—what it would otherwise be; and the train-pipe having a fair diameter—say one inch—the air can all be liberated from one central point on the engine without sacrificing that rapidity of action heretofore attained only by more complicated arrangements. Further, the gripe of the brake can be graduated much more easily, and be varied incessantly to either a stronger or lighter force without at any time entirely releasing it—a feature of great importance in working heavy or fast trains. Finally, in both systems the simple arrangement of the main pipe is an important feature. This saves all branch pipes with their manifold joints and connections, whose frequent leakage or fracture materially detracts from the value of air-pressure brakes.

In case of a rupture of the train-pipe $c$, as by a parting of the train, the pressure in the pipe $c$ is relieved and the brakes are applied instantly.

Modifications may be made in the details. I can use other forms than those shown for the devices $h$ and $i$. Gravity alone may urge both or either downward. I show a spring forcing downward the device $i$ in Fig. 1. I term both the parts $h$ and $i$ "stops," their function being to determine the changeable relations of the serrated rod $k$ to the other parts.

I claim as my invention—

1. The combination of the cylinder $a$ and chamber $a'$, for compressed air, with each other and with the air supply and discharge pipe $c$, and with interposed regulating-valve, so as to constitute a single vessel directly connected to the supply and discharge and regulated, all arranged substantially as herein specified.

2. In an air-brake apparatus, the regulating mechanism described, having a serrated bar, in combination with a transverse locking-slide, and with a hollow piston-rod, a spring lying on one side thereof, arranged as herein specified.

3. In an air-brake mechanism having a cylinder and piston, a longitudinal groove or passage in the cylinder arranged relatively to the piston, so that the piston shall serve as a valve, allowing the air sufficient passage when the apparatus is being charged and is out of use, and holding it tightly when the air in the main pipe is released and the accumulated air is allowed to act, as herein specified.

4. In automatic brakes, a valve apparatus having rings, pistons, and a channel in the stem of the valve, arranged as shown relatively to the inclosing-case, the train-pipe, the cylinder and its connections, and the passage to the external atmosphere, so that the valve rests on the bottom of its chamber when out of action, rises to apply the brake, and sinks to release it, substantially as herein specified.

J. F. CARPENTER.

Witnesses:
BANCROFT C. DAVIS,
BERTHOLD ROI.